United States Patent
Lee

(10) Patent No.: US 7,604,569 B2
(45) Date of Patent: Oct. 20, 2009

(54) METHOD FOR CONTROLLING SHIFTING DURING SHIFTING AND SYSTEM THEREOF

(75) Inventor: Jin Soo Lee, Suwon (KR)

(73) Assignee: Hyundai Motor Company, Seoul (KR)

( * ) Notice: Subject to any disclaimer, the term of this patent is extended or adjusted under 35 U.S.C. 154(b) by 447 days.

(21) Appl. No.: 11/709,502

(22) Filed: Feb. 22, 2007

(65) Prior Publication Data

US 2008/0139365 A1 Jun. 12, 2008

(30) Foreign Application Priority Data

Dec. 9, 2006 (KR) ............... 10-2006-0125185

(51) Int. Cl.
*F16H 61/26* (2006.01)
(52) U.S. Cl. ............... 477/127; 477/130; 477/156; 477/164
(58) Field of Classification Search ............... 477/127, 477/130, 131, 156, 163, 164
See application file for complete search history.

(56) References Cited

U.S. PATENT DOCUMENTS 5,644,916 A * 7/1997 Hayasaki .............. 60/436
6,719,657 B2 * 4/2004 Nishida et al. ............. 475/65
6,835,164 B2 * 12/2004 Habeck .................. 477/132
7,008,344 B2 * 3/2006 Aikawa et al. ............. 475/127
2008/0139364 A1 * 6/2008 Lee ....................... 477/143

FOREIGN PATENT DOCUMENTS

JP 2001-041317 2/2001

* cited by examiner

*Primary Examiner*—Ha D. Ho
(74) *Attorney, Agent, or Firm*—Morgan, Lewis & Bockius LLP

(57) ABSTRACT

A system for controlling a shifting during shifting, in which a frictional element is re-engaged in mid-course of being released, includes: one or more detectors for detecting driving information of a vehicle and generating one or more signals corresponding thereto; a transmission control unit for receiving the signals from the detectors and generating a control signal; and an actuator for receiving the control signal and generating a control pressure for controlling a transmission. The transmission control unit performs a control method of the shifting during shifting. The method includes: detecting driving information of a vehicle; determining whether the shifting during shifting is occurring; if the shifting during shifting is occurring, maintaining a control pressure at a stand-by pressure; determining whether an engaging condition of the frictional element is satisfied; and increasing the control pressure of the frictional element.

8 Claims, 3 Drawing Sheets

|    | B1 | C1 | C2 | B2 | B3 | F1 |
|----|----|----|----|----|----|----|
| D1 | ●  |    |    |    |    | ●  |
| D2 | ●  |    |    | ●  |    |    |
| D3 | ●  |    | ●  |    |    |    |
| D4 | ●  | ●  |    |    |    |    |
| D5 |    | ●  | ●  |    |    |    |
| D6 |    | ●  |    | ●  |    |    |
| R  |    |    | ●  |    | ●  |    |

METHOD FOR CONTROLLING SHIFTING DURING SHIFTING AND SYSTEM THEREOF

CROSS-REFERENCE TO RELATED APPLICATION

This application claims priority to and the benefit of Korean Patent Application No. 10-2006-0125185 filed in the Korean Intellectual Property Office on Dec. 9, 2006, the entire contents of which are incorporated herein by reference.

BACKGROUND OF THE INVENTION (a) Field of the Invention

The present invention relates to a method for controlling a shifting during shifting, defined as a frictional element being re-engaged in mid-course of being released, and a system thereof. More particularly, the present invention relates to a method for controlling a shifting during shifting and a system thereof that reduce shift shock by prohibiting a pre-charge in the case of shifting during shifting.

(b) Description of the Related Art

Generally, an automatic transmission shifts to a target shift speed, derived from a predetermined shifting pattern based on vehicle speed and variation of a throttle opening. Operational elements are controlled according to a hydraulic duty of the target shift speed.

During shifting, an off-going element is released from an engaged state and an on-coming element is engaged from a released state. Releasing an off-going element and engaging an on-coming element are achieved by controlling hydraulic pressure supplied to the elements.

To engage the on-coming element, a transmission control unit receives a shifting signal, and drives an actuator such that a hydraulic pressure of the on-coming element is quickly raised to a pre-charge pressure, at which it is maintained for a predetermined time. This is for quickly engaging the on-coming element.

After that, the transmission control unit quickly reduces the hydraulic pressure of the on-coming element and then gradually increases the hydraulic pressure of the on-coming element with a predetermined gradient. The hydraulic pressure applied at this state is called a stand-by pressure.

The above described method is also traditionally used to control engagement of the on-coming element of shifting during shifting, in which a frictional element is re-engaged in mid-course of being released. Therefore, shift shock may occur at a pre-charge process as a consequence of residual control pressure of a previous shift.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention provides a method for controlling shifting during shifting, and a system thereof, with reduced shift shock. Pre-charge in the case of shifting during shifting is prohibited.

A system for controlling shifting during shifting according to an exemplary embodiment of the present invention includes: a throttle opening detector; a vehicle speed detector; a turbine speed detector; an engine speed detector; a transmission control unit receiving signals from the detectors and generating a control signal; and an actuator receiving the control signal and generating a control pressure for controlling a transmission. The transmission control unit is programmed to perform a method for controlling shifting during shifting, in which a frictional element is re-engaged in mid-course of being released, according to an exemplary embodiment of the present invention.

A method for controlling shifting during shifting according to an exemplary embodiment of the present invention includes: detecting driving information of a vehicle; determining whether shifting during shifting is occurring; maintaining a control pressure at a stand-by pressure if shifting during shifting is occurring; determining whether an engaging condition of the frictional element is satisfied; and increasing the control pressure of the frictional element.

The driving information may include throttle opening, vehicle speed, turbine speed, and/or engine speed.

The shifting during shifting may be deemed to occur if a solenoid valve that controls the control pressure of the frictional element is turned on within a predetermined time after being turned off.

The engaging condition of the frictional element may be deemed to be satisfied if a delay time has passed since the control pressure was maintained at the stand-by pressure, or if a current gear ratio is the same as a predetermined gear ratio.

The delay time may be selected based on the vehicle speed and the current gear ratio.

The current gear ratio may be selected based on the vehicle speed and the turbine speed.

DETAILED DESCRIPTION OF THE PREFERRED EMBODIMENTS

Figures 1, 2:
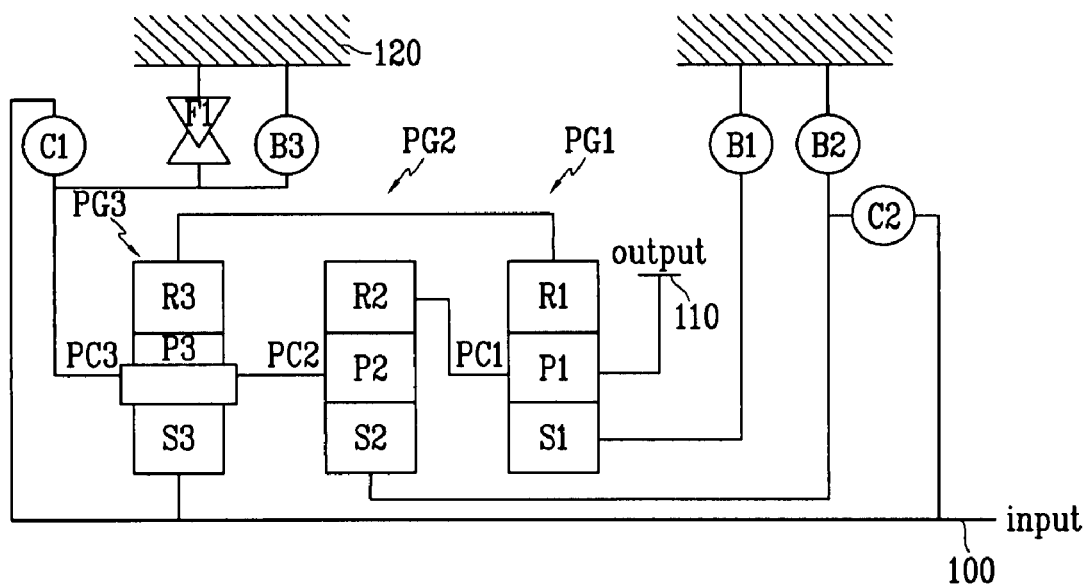
FIG. 1 is a schematic diagram showing a power train of an automatic transmission to which a method for controlling a shifting during shifting according to an exemplary embodiment of the present invention is applied.
FIG. 2 is an operational chart of the power train shown in FIG. 1.

Hereinafter, referring to the drawings, an exemplary embodiment of the present invention will be described in detail.

As shown in FIG. 1, in an exemplary embodiment, a power train of an automatic transmission includes first, second, and third planetary gear sets PG1, PG2, and PG3.

The first planetary gear set PG1 is a single pinion planetary gear set, including a first sun gear S1, a first planet carrier PC1, and a first ring gear R1. A first pinion gear P1, engaged with the first ring gear R1 and the first sun gear S1, is connected to the first planet carrier PC1.

The second planetary gear set PG2 is a single pinion planetary gear set, and includes a second sun gear S2, a second planet carrier PC2, and a second ring gear R2. A second pinion gear P2, engaged with the second ring gear R2 and the second sun gear S2, is connected to the second planet carrier PC2.

The third planetary gear set PG3 is a double pinion planetary gear set, and includes a third sun gear S3, a third planet carrier PC3, and a third ring gear R3. A third pinion gear P3, engaged with the third ring gear R3 and the third sun gear S3, is connected to the third planet carrier PC3.

In an exemplary embodiment, the power train further includes an input shaft 100 for receiving torque from an engine (not shown), an output gear 110 for outputting the torque, and a transmission case 120. The first planet carrier PC1 is fixedly connected to the second ring gear R2. The second planet carrier PC2 is fixedly connected to the third planet carrier PC3. The first ring gear R1 is fixedly connected to the third ring gear R3. The third sun gear S3 always acts as an input element by being fixedly connected to the input shaft 100. The first planet carrier PC1 always acts as an output element by being fixedly connected to the output gear 110. The third planet carrier PC3 is variably connected to the input shaft 100 via a first clutch C1. The second sun gear S2 is variably connected to the input shaft 100 via a second clutch C2. The first sun gear S1 is variably connected to the transmission case 120 via a first brake B1 and is subjected to a stopping operation of the first brake B1. The second sun gear S2 is variably connected to the transmission case 120 via a second brake B2 and is subjected to a stopping operation of the second brake B2. The third planet carrier PC3 is variably connected to the transmission case 120 via a third brake B3 and is subjected to a stopping operation of the third brake B3. In addition, a one-way clutch F1, disposed between the third planet carrier PC3 and the transmission case 120, is disposed in parallel with the third brake B3.

Referring now to FIG. 2, the first brake B1 and the one-way clutch F1 are operated at a first forward speed D1. The first and second brakes B1 and B2 are operated at a second forward speed D2. The first brake B1 and the second clutch C2 are operated at a third forward speed D3. The first brake B1 and the first clutch C1 are operated at a fourth forward speed D4. The first and second clutches C1 and C2 are operated at a fifth forward speed D5. The first clutch C1 and the second brake B2 are operated at a sixth forward speed D6. The second clutch C2 and the third brake B3 are operated at a reverse speed R.

An up-shifting processes for the power train shown in FIGS. 1 and 2 will now be described in detail. In a shifting process from the first forward speed D1 to the second forward speed D2, the second brake B2 is operated. In this case, the one-way clutch F1 is automatically released without an additional control. In a shifting process from the second forward speed D2 to the third forward speed D3, the second brake B2 is released and the second clutch C2 is operated. In a shifting process from the third forward speed D3 to the fourth forward speed D4, the second clutch C2 is released and the first clutch C1 is operated. In a shifting process from the fourth forward speed D4 to the fifth forward speed D5, the first brake B1 is released and the second clutch C2 is operated. In a shifting process from the fifth forward speed D5 to the sixth forward speed D6, the second clutch C2 is released and the second brake B2 is operated. Down-shifting processes are reverse processes of the up-shifting processes.

Skip down-shifting processes for the power train of the automatic transmission shown in FIGS. 1 and 2 will now be described in detail. In a skip shifting process from the sixth forward speed D6 to the fourth forward speed D4, the second brake B2 is released and the first brake B1 is operated. In a skip shifting process from the fifth forward speed D5 to the third forward speed D3, the first clutch C1 is released and the first brake B1 is operated. In a skip shifting process from the fourth forward speed D4 to the second forward speed D2, the first clutch C1 is released and the second brake B2 is operated. In a skip shifting process from the third forward speed D3 to the first forward speed D1, the second clutch C2 is released. The one-way clutch F1 is automatically operated.

Figure 3:
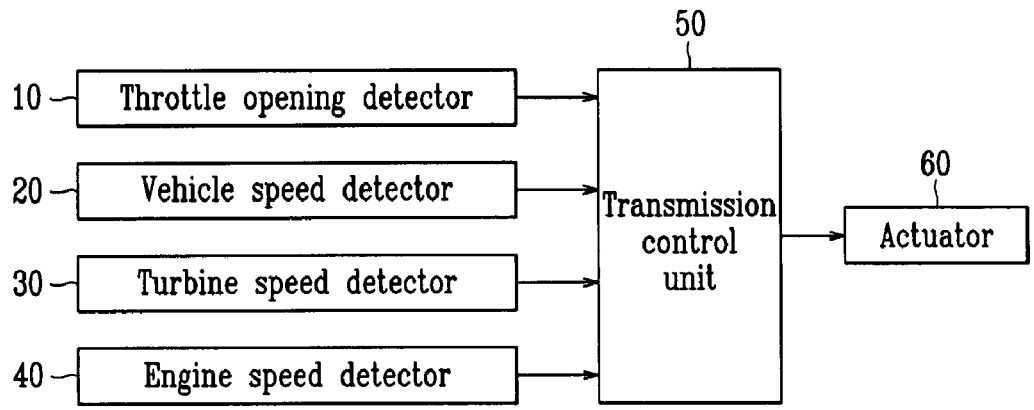
FIG. 3 is a block diagram of a system for controlling a shifting during shifting according to an exemplary embodiment of the present invention.

Referring now to FIG. 3, a system for controlling shifting during shifting according to an exemplary embodiment of the present invention includes a throttle opening detector 10, a vehicle speed detector 20, a turbine speed detector 30, an engine speed detector 40, a transmission control unit 50, and an actuator 60.

The throttle opening detector 10 detects an opening of a throttle valve that is operated in accordance with an operation of an acceleration pedal, and transmits a signal corresponding thereto to the transmission control unit 50.

The vehicle speed detector 20 detects a vehicle speed and transmits a signal corresponding thereto to the transmission control unit 50.

The turbine speed detector 30 detects a current turbine speed that is operated as an output torque of a torque converter, and transmits a signal corresponding thereto to the transmission control unit 50.

The engine speed detector 40 detects a current engine speed that is operated as an input torque of the torque converter based on an angular displacement of a crank shaft, and transmits a signal corresponding thereto to the transmission control unit 50.

The transmission control unit 50 may include a processor, memory, and associated hardware, software, and/or firmware as may be selected and programmed by a person of ordinary skill in the art based on the teachings herein. The transmission control unit 50 may be activated by a program that performs each step of a method for controlling the shifting during shifting according to an embodiment of this invention.

The transmission control unit 50 receives driving information from the throttle opening detector 10, the vehicle speed detector 20, the turbine speed detector 30, and the engine speed detector 40, and generates a control signal for controlling engagement and release of respective frictional elements of the automatic transmission based on the driving information.

The driving information may include the throttle opening, the vehicle speed, the turbine speed, and/or the engine speed.

The transmission control unit 50 includes a map table in which delay times corresponding to the vehicle speed and a current gear ratio are stored. Current gear ratios corresponding to the vehicle speed and the turbine speed are also stored in the map table.

The actuator 60 receives the control signal from the transmission control unit 50 and controls the engagement and release of the respective frictional elements of the automatic transmission. The actuator 60 includes at least one solenoid valve that controls a hydraulic pressure in the automatic transmission.

Figure 4:
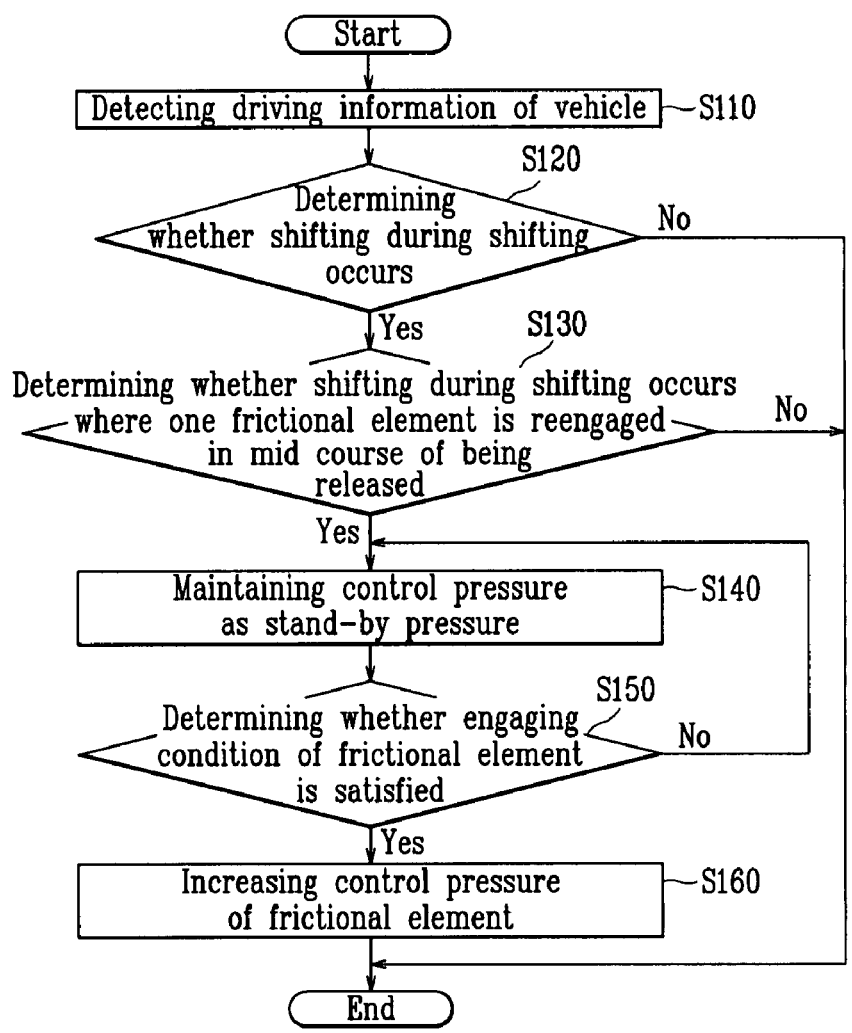
FIG. 4 is a flowchart of a method for controlling a shifting during shifting according to an exemplary embodiment of the present invention.

Hereinafter, referring to FIG. 4, a method for controlling the shifting during shifting according to the exemplary embodiment of the present invention will be described in detail.

In a running state of a vehicle, the detectors 10, 20, 30, and 40 detect the driving information of the vehicle at step S110 and transmit the signals corresponding thereto to the transmission control unit 50.

Figure 5:
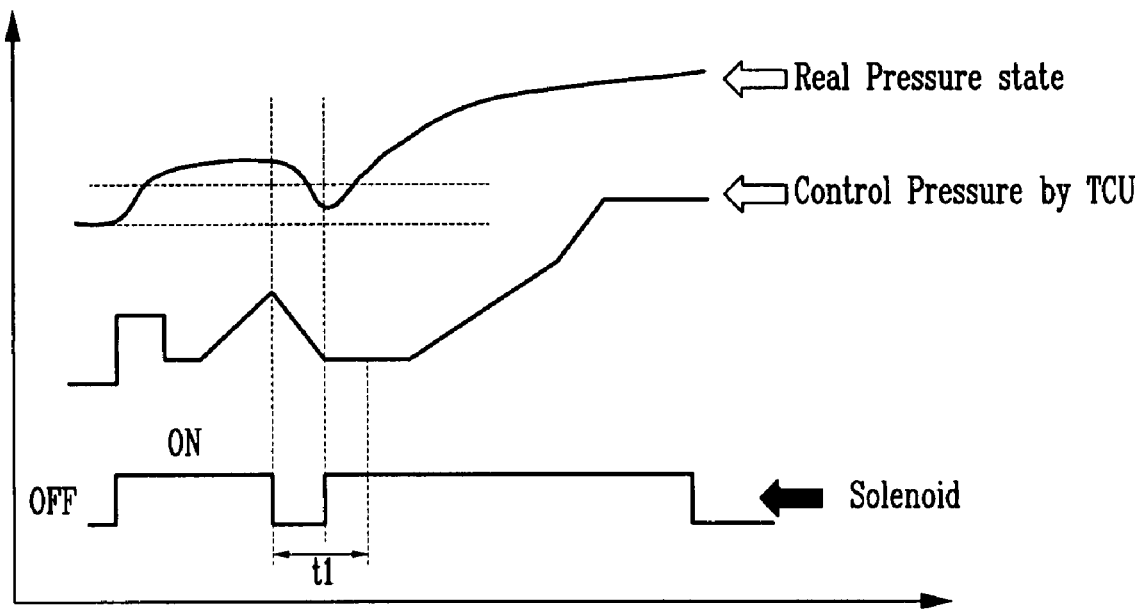
FIG. 5 is a control diagram for performing a method for controlling a shifting during shifting according to an exemplary embodiment of the present invention.

The transmission control unit 50 determines, based on the driving information, whether shifting during shifting occurs at step S120. If shifting during shifting does not occur at step S120, the method finishes. If shifting during shifting occurs at step S120, the transmission control unit 50 determines whether the shifting during shifting occurs where one frictional element is re-engaged in mid-course of being released, at a step S130. For example, as shown FIG. 1 and in FIG. 2, when the vehicle is shifted from the third forward speed D3 to the fifth forward speed D5 via the fourth forward speed D4, the second clutch C2 is re-engaged in mid-course of being released. The shifting during shifting where one frictional element is re-engaged in mid-course of being released, as shown in FIG. 5, may occur when a solenoid valve controlling the control pressure of the frictional element is turned on again within a predetermined time t1 after being turned off. The predetermined time t1, for example and without limitation, may be 250 ms.

If the shifting during shifting where one frictional element is re-engaged in mid-course of being released does not occur at step S130, the method finishes.

If the shifting during shifting where one frictional element is re-engaged in mid-course of being released occurs at step S130, as shown in FIG. 5, the transmission control unit 50 drives the actuator 60 to maintain the control pressure of the one frictional element at a stand-by pressure, at step S140.

After that, the transmission control unit 50 determines whether an engaging condition of the frictional element is satisfied at a step S150. The engaging condition of the frictional element is satisfied if the delay time t2 has passed since the control pressure was maintained as the stand-by pressure, or if a current gear ratio is the same as a predetermined gear ratio.

The delay time t2 is the time required for a residual control pressure of a previous shifting to be gone. Therefore, if the control pressure is applied to the frictional element after the delay time t2 has passed, torque does not increase. Such delay time t2 can be obtained by a person of an ordinary skill in the art based on the teachings herein. According to an exemplary embodiment of the present invention, the delay time t2 is set according to the vehicle speed and the current gear ratio.

Figure 6:
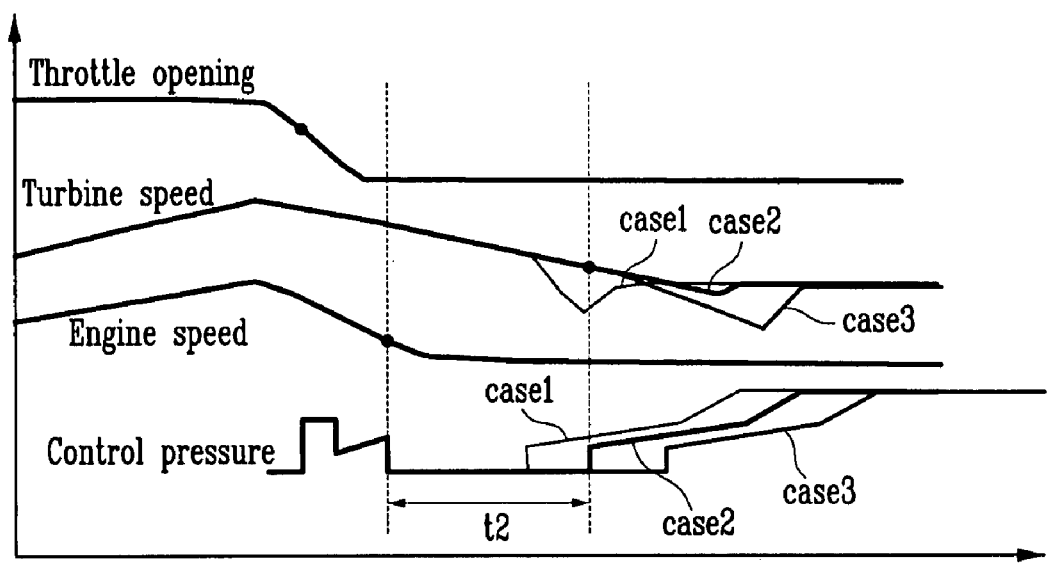
FIG. 6 is a graph showing a control pressure in accordance with a turbine speed and an engine speed that is used in a method for controlling a shifting during shifting according to an exemplary embodiment of the present invention.

In addition, if the control pressure is abnormally applied to the frictional element even before the delay time t2 has passed since the turbine speed corresponding to the engine speed changed abruptly, such as case 1 in FIG. 6, the control pressure is applied to the frictional element when the current gear ratio is the same as the predetermined gear ratio. The current gear ratio is set according to the vehicle speed and the turbine speed. The predetermined gear ratio can be easily obtained by a person of ordinary skill in the art based on the teachings herein, and thus, a detailed description of the predetermined gear ratio will be omitted.

Case 2 and case 3 in FIG. 6 show the control pressure being applied to the frictional element when the delay time t2 corresponding to the vehicle speed and the current gear ratio has passed.

If the engaging condition of the frictional element is not satisfied at step S150, the transmission control unit 50 continues to maintain the control pressure at the stand-by pressure at the step S140.

If the engaging condition of the frictional element is satisfied at the step S150, the transmission control unit 50 increases the control pressure and engages the frictional element at a step S160.

According to the present invention, in a case of a shifting during shifting where one frictional element is re-engaged in mid-course of being released, a pre-charge is prohibited, reducing the effect of residual control pressure of a previous shift. Therefore, shift shock is reduced.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for controlling a shifting during shifting, in which a frictional element is re-engaged in mid-course of being released, comprising:
    detecting driving information of a vehicle;
    determining whether the shifting during shifting is occurring;
    if the shifting during shifting is occurring, maintaining a control pressure at a stand-by pressure;
    determining whether an engaging condition of the frictional element is satisfied; and
    increasing the control pressure of the frictional element.

2. The method of claim 1, wherein the driving information comprises at least one of a throttle opening, a vehicle speed, a turbine speed, and an engine speed.

3. The method of claim 1, wherein the shifting during shifting is determined to occur if a valve that controls the control pressure of the frictional element is turned on within a predetermined time after being turned off.

4. The method of claim 1, wherein the engaging condition of the frictional element is determined to be satisfied if a delay time has passed since the control pressure was maintained at the stand-by pressure, or if a current gear ratio is substantially equal to a predetermined gear ratio.

5. The method of claim 4, wherein the delay time is selected based on a vehicle speed and the current gear ratio.

6. The method of claim 4, wherein the current gear ratio is selected based on a vehicle speed and a turbine speed.

7. A system for controlling a shifting during shifting, in which a frictional element is re-engaged in mid-course of being released, comprising:
    one or more detectors for detecting driving information of a vehicle and generating one or more signals corresponding thereto;
    a transmission control unit for receiving the signals from the detectors and generating a control signal; and
    an actuator for receiving the control signal and generating a control pressure for controlling a transmission;
    wherein the transmission control unit is programmed to perform a control method of the shifting during shifting, the method comprising:
    determining whether the shifting during shifting is occurring;
    if the shifting during shifting if determined to occur, maintaining the control pressure at a stand-by pressure;
    determining whether an engaging condition of the frictional element is satisfied; and
    increasing the control pressure of the frictional element.

8. The system of claim 7, wherein the detectors comprise at least one of a throttle opening detector; a vehicle speed detector; a turbine speed detector; and an engine speed detector.

* * * * *